United States Patent [19]

Shirahata et al.

[11] Patent Number: 4,465,818

[45] Date of Patent: Aug. 14, 1984

[54] ROOM TEMPERATURE STABLE, HEAT ACTIVATED ORGANOPOLYSILOXANE COMPOSITIONS

[75] Inventors: Akihiko Shirahata; Shosaku Sasaki, both of Ichihara, Japan

[73] Assignee: Toray Silicone Company, Ltd., Tokyo, Japan

[21] Appl. No.: 478,433

[22] Filed: Mar. 24, 1983

[30] Foreign Application Priority Data

Apr. 2, 1984 [JP] Japan ............... 57-54877

[51] Int. Cl.³ .................. C08K 5/01; C08L 83/04; C08G 77/06
[52] U.S. Cl. ........................ 528/12; 525/478; 525/479; 528/15; 528/25; 528/31; 528/32
[58] Field of Search .......... 528/15, 31, 25, 32, 528/12; 525/478, 479

[56] References Cited

U.S. PATENT DOCUMENTS

| | | | |
|---|---|---|---|
| 3,383,356 | 5/1968 | Nielsen | 528/32 |
| 3,445,420 | 5/1969 | Kookcotsedes et al. | 528/15 |
| 3,461,185 | 8/1969 | Brown | 528/31 |
| 3,983,298 | 9/1976 | Hann et al. | 528/31 |
| 3,989,668 | 11/1976 | Lee et al. | 528/15 |
| 4,077,937 | 3/1978 | Sato et al. | 528/15 |
| 4,256,870 | 3/1981 | Eckberg | 528/12 |
| 4,288,345 | 9/1981 | Ashby et al. | 528/32 |
| 4,336,364 | 6/1982 | Maxson | 528/31 |
| 4,340,710 | 7/1982 | Brown | 525/478 |
| 4,347,347 | 8/1982 | Eckberg | 528/15 |

FOREIGN PATENT DOCUMENTS 51-28119 8/1976 Japan .
53-35983 10/1978 Japan .
54-3774 2/1979 Japan .

Primary Examiner—Herbert J. Lilling
Attorney, Agent, or Firm—George A. Grindahl

[57] ABSTRACT

Organopolysiloxane compositions which react by way of a hydrosilylation reaction to undergo an increase in viscosity have improved resistance to reaction at room temperature (longer pot life) and/or an improved reaction rate at elevated temperature (shorter cure time) than analogous compositions of the art by incorporating therein an unsaturated hydrocarbon having from 6 to 10 carbon atoms, a terminal acetylenic linkage and an olefinic linkage conjugated therewith. The resulting compositions are useful for preparing various cured siloxanes such as resins, elastomers, gels and foams.

20 Claims, No Drawings

ROOM TEMPERATURE STABLE, HEAT ACTIVATED ORGANOPOLYSILOXANE COMPOSITIONS

BACKGROUND OF THE INVENTION

This invention concerns organopolysiloxane compositions which contain a storage stabilizer with a specific structure. In particular, this invention concerns organopolysiloxane compositions which exhibit excellent storage stability for long periods of time at room temperature and which rapidly cure by a hydrosilylation reaction when heated.

A variety of conventional types of organopolysiloxane compositions have been proposed which are primarily composed of a vinyl group-containing organopolysiloxane, an organohydrogenpolysiloxane and a platinum catalyst to which a stabilizer has been added to improve the storage stability and which are cured when the addition reaction is accelerated by heating (U.S. Pat. Nos. 3,383,356, 3,445,420, and 3,461,185, Japanese Pat. Nos. Sho 51[1976]-28119, Sho 53 [1978]-35983 and Sho 54[1979]-3774). These compositions can be stored for long periods of time as a mixture of all the components and curing occurs only when the compositions are heated.

In particular, addition type-curable organopolysiloxane compositions are known which use a compound possessing a carbon-carbon double or triple bond as the storage stabilizer. Typical examples of the compounds used as stabilizers are tetrachloroethylene (U.S. Pat. No. 3,383,356) and 3-methyl-1-butyne-3-ol (U.S. Pat. No. 3,445,420). These storage stabilizers can effectively inhibit the addition reaction catalytic activity of the platinum or platinum compound and can satisfactorily prolong the pot life of a mixture of all the components in the addition type-curable organopolysiloxane compositions.

However, for the recent diversified demands for performance, the inhibitory activities of these compounds are not satisfactory. Addition type-curable organopolysiloxanes which use these compounds as storage stabilizers slowly undergo an increase in viscosity after being stored for long periods of time. If a large amount of storage stabilizer is used in order to reduce completely the increase in the viscosity, problems occur in that separation occurs due to insufficient compatibility and curing must be carried out at quite a high temperature.

BRIEF SUMMARY OF THE INVENTION

It is an object of the present invention to provide organopolysiloxane compositions which do not suffer the above-mentioned drawbacks. In particular, it is an object of this invention to provide organopolysiloxane compositions which experience substantially no increase in viscosity at room temperature but which rapidly increase in viscosity when heated.

Briefly, these objects, and others which will become apparent to one of average skill in the organosiloxane polymer art upon consideration of the following disclosure and appended claims, are accomplished by including in an organopolysiloxane composition which is reactive by way of a catalyzed hydrosilylation reaction at room temperature a reaction-inhibiting amount of an unsaturated $C_6$ to $C_{10}$ hydrocarbon comprising a terminal ethynyl linkage which is conjugated with an olefinic linkage.

A characteristic of the organopolysiloxane compositions of this invention is an extremely effective temperature dependence during the curing process unlike conventional techniques. In particular, curability at a relatively low temperature is excellent. For example, although the pot life at room temperature is sufficiently long for practical uses, rapid curing occurs by slight external heating to give a resinous product, elastic product, gel or foamed product.

DETAILED DESCRIPTION OF THE INVENTION

The present invention relates to a composition obtained by a method comprising the mixing of components comprising (a) an alkenyl group-containing organopolysiloxane component comprising at least one siloxane unit having the formula $R_a^1 R_b^2 SiO_{(4-a-b)/2}$ wherein $R^1$ denotes a silicon-bonded alkenyl group having from 2 to 4 carbon atoms, inclusive, $R^2$ denotes a silicon-bonded substituted or unsubstituted monovalent hydrocarbon group, a has a value of from 1 to 3, b has a value of from 0 to 2 and a+b has a value of from 1 to 3, all values inclusive, any remaining siloxane units in the alkenyl group-containing organopolysiloxane having the formula $R_x^2 SiO_{(4-x)/2}$ wherein $R^2$ is as denoted above and x has a value of from 0 to 3, inclusive;

(b) an organohydrogenpolysiloxane component comprising at least one siloxane unit having the formula $H_c R_d^3 SiO_{(4-c-d)/2}$ wherein $R^3$ denotes a silicon-bonded substituted or unsubstituted monovalent hydrocarbon group, c has a value of from 1 to 3, d has a value of from 0 to 2 and c+d has a value of from 1 to 3, all values inclusive, any remaining siloxane units in the organohydrogenpolysiloxane having the formula $R_y^3 SiO_{(4-y)/2}$ wherein $R^3$ is as denoted above and y has a value of from 0 to 3, inclusive;

(c) a cure catalyzing amount of a hydrosilylation curing catalyst component for the composition; and (d) a cure inhibiting amount of an unsaturated hydrocarbon component having the formula $HC\equiv C-CR^4=CR^5 R^6$ wherein each $R^4$, $R^5$ and $R^6$ denotes, independently, a hydrogen atom, a monovalent hydrocarbon group or a divalent hydrocarbon group with the requirements that the total number of carbon atoms in the $R^4$, $R^5$ and $R^6$ groups has a value of from 2 to 6 and when $R^4$ and $R^5$ or $R^5$ and $R^6$ are divalent they are bonded together by their second valence.

Component (a) of the compositions of this invention is an alkenyl group-containing organopolysiloxane, which contains at least one siloxane unit having the formula (1).

$$R_a^1 R_b^2 SiO_{(4-a-b)/2} \qquad (1)$$

Organopolysiloxane (a) may be composed only of the organosiloxane units expressed by formula (1) or may contain other organosiloxane units having the formula (1a).

$$R_x^2 SiO_{(4-x)/2} \qquad (1a)$$

The structure of the alkenyl group-containing organopolysiloxane may be linear, branched chain, cyclic or network. The degree of polymerization is two or greater and the upper limit on this is the degree of polymerization at which polymerization is possible, ordinarily 10,000.

$R^1$ denotes a silicon-bonded alkenyl group having from 2 to 4 carbon atoms such as vinyl, propenyl, allyl, butenyl and isobutenyl. Typically, $R^1$ is a vinyl group.

$R^2$ represents identical or different substituted or unsubstituted monovalent hydrocarbon groups. Examples of unsubstituted monovalent hydrocarbon groups include alkyl groups such as methyl, ethyl, propyl, butyl and octyl; aryl groups such as tolyl, xylyl and phenyl; and aralkyl groups such as phenylethyl and phenylpropyl. Substituted monovalent hydrocarbon groups include those in which, besides carbon and hydrogen, some or all of the hydrogen atoms in the abovementioned groups are substituted with halogen such as fluorine and chlorine, such as 3-chloropropyl, 2-methyl-3-chloropropyl, chlorophenyl and 3,3,3-trifluoropropyl groups. The number of carbon atoms in these substituted or unsubstituted monovalent hydrocarbon groups generally ranges form 1 to 20.

In the above-mentioned formulae, a denotes an integer having a value of from 1 to 3, preferably 1, b denotes an integer having a value of from 0 to 2, the sum of a+b has a value of from 1 to 3 and x denotes an integer having a value of from 0 to 3.

Concrete examples of the siloxane units represented by formula (1) include triorganosiloxane units such as vinyldimethylsiloxane, vinylphenylmethylsiloxane and vinylmethyl(3,3,3-trifluoropropyl)siloxane; diorganosiloxane units such as vinylmethylsiloxane and vinyl(3,3,3-trifluoropropyl)siloxane and monoorganosiloxane units such as vinylsiloxane.

Concrete examples of the siloxane units represented by formula (1a) include $SiO_{4/2}$, diorganosiloxane units such as dimethylsiloxane, methylphenylsiloxane, diphenylsiloxane, methyloctylsiloxane, methyl(3,3,3-trifluoropropyl)siloxane, methyl(3-chloropropyl)siloxane and methyl(2-methyl-3-chloropropyl)siloxane; triorganosiloxanes such as trimethylsiloxane, dimethylphenylsiloxane and dimethyl(3,3,3-trifluoropropyl)-siloxane; monoorganosiloxanes such as methylsiloxane, propylsiloxane, phenylsiloxane, 3,3,3-trifluoropropyl-siloxane, 3-chloropropylsiloxane and 2-methyl-3-chloropropyl siloxane.

Concrete examples of the alkenyl group-containing organopolysiloxanes used in this invention are dimethylvinylsiloxy-terminated polydimethylsiloxane, phenylmethylvinylsiloxy-terminated diphenylsiloxy dimethylsiloxy copolymer polysiloxanes and trimethylsiloxy-terminated methylvinylsiloxy dimethylsiloxy copolymer polysiloxanes. However, the applicable alkenyl group-containing organopolysiloxanes of this invention are not limited by these examples and can comprise, for example, any combination of two or more of the above-mentioned siloxane units provided that at least one siloxane unit having the formula (1) is included.

Component (b) of the compositions of this invention is an organohydrogenpolysiloxane which contains at least one siloxane unit having the formula (2).

$$H_c R_d^3 SiO_{(4-c-d)/2} \quad (2)$$

Organohydrogenpolysiloxane (b) may be composed only of the organosiloxane units expressed by formula (2) or may contain other organosiloxane units having the formula (2a).

$$R_y^3 SiO_{(4-y)/2} \quad (2a)$$

The structure of the organohydrogenpolysiloxane may be linear, branched chain, cyclic or network. The degree of polymerization is two or greater and the upper limit on this 2s the degree of polymerization at which polymerization remains possible, ordinarily 10,000. $R^3$ represents identical or different substituted or unsubstituted monovalent hydrocarbon groups and are exemplified by the disclosure for $R^2$ groups, delineated above.

In the above-mentioned formulae, c denotes an integer having a value of from 1 to 3, preferably 1, d dentoes an integer having a value of from 0 to 2, the sum of c+d has a value of from 1 to 3 and y denotes an integer having a value of from 0 to 3.

Concrete examples of the siloxane units represented by formula (2) include $H(CH_3)_2SiO_{\frac{1}{2}}$, $H(CH_3)(C_6H_5)SiO_{\frac{1}{2}}$, $H(CH_3)(CF_3CH_2CH_2)SiO_{\frac{1}{2}}$, $H(CH_3)SiO_{2/2}$, $H(CH_6H_5)SiO_{2/2}$, $H(CF_3CH_2CH_2)SiO_{2/2}$ and $HSiO_{3/2}$.

Concrete examples of the siloxane units represented by formula (2a) include those examples delineated above for those siloxane units represented by formula (1a).

Concrete examples of the organohydrogenpolysiloxanes used in this invention are: dimethylhydrogensiloxy-terminated dimethylsiloxy methylhydrogensiloxy copolymer polysiloxanes, trimethylsiloxy-terminated dimethylsiloxy methyl hydrogensiloxy copolymer polysiloxanes and cyclic methyl hydrogen polysiloxanes. However, applicable examples are not limited by these examples and can comprise, for example, any combination of two or more of the siloxane units represented by formulae (2) and (2a) provided that at least one siloxane unit having the formula (2) is included.

Compenents (a) and (b) are reacted in the presence of a hydrosilylation reaction catalyst, component (c), which will be described in detail later to yield a product with an increased molecular weight. In order to obtain a product with a very high molecular weight, component (a) preferably contains at least an average of two alkenyl groups per molecule and component (b) preferably contains at least an average of two silicon-bonded hydrogen groups per molecule. Components (a) and (b) may be mixed in the desired proportion. Generally, component (b) is added in such a proportion that the amount of hydrogen groups is 0.2 to 5 times greater on an equivalent basis than the amount of alkenyl groups, such as vinyl groups, in component (a). If the proportion of hydrogen groups falls below 0.2-fold on an equivalent basis, curing is insufficient. If it exceeds 5-fold on an equivalent basis, hydrogen gas foaming occurs which interferes with the stability of the curing system. However, in the case of compositions for the production of silicone foamed products, the amount may exceed 5-fold on an equivalent basis. In the compositions of this invention, components (a) and (b) are preferably sufficiently compatible with each other. If the compatibility between components (a) and (b) is poor, curing is unsatisfactory and uneven curing occurs easily.

The hydrosilylation reaction catalysts, component (c) of the compositions of this invention, are those which are known to be used for hydrosilylation. Concrete examples include: finely powdered platinum, finely powdered platinum absorbed on a carbon powder support, chloroplatinate, alcohol-modified chloroplatinate, chloroplatinate-olefin complexes, chloroplatinate-vinylsiloxane coordination compounds, platinum black, tetrakis(triphenylphosphine)palladium, palladium black and rhodium catalysts. The amount to be added is the amount which is sufficient for curing the compositions composed of the above-mentioned components (a) and (b). In the case of a platinum catalyst in a homogeneous system, component (c) is used in a weight proportion of 0.1 ppm to 100 ppm based on the total amount of components (a) and (b). In the case of a catalyst in a heterogeneous system, such as platinum black, it is used preferably in the range of 20 ppm to 1000 ppm on the same basis.

The unsaturated hydrocarbons, component (d) of the compositions of this invention, are expressed by the general formula (3).

$$HC\equiv C-CR^4=CR^5R^6 \quad (3)$$

In formula (3), $R^4$, $R^5$ and $R^6$ each denote, independently, a hydrogen atom, a monovalent hydrocarbon group or a divalent hydrocarbon group with the requirement that the total number of carbon atoms in these groups must range from 2 to 6. That is, the total number of carbon atoms in the unsaturated hydrocarbon itself must be 6 to 10. In the hydrocarbons with a carbon number of 5 or less, the boiling points are too low so that they cannot be used in practice due to easy volatilization at room temperature under the atmospheric pressure. In contrast, if the carbon number exceeds 10, its compatibility with organopolysiloxanes becomes poor, thus causing separation of the storage stabilizer and uneven curing.

Examples of the monovalent hydrocarbon groups $R^4$, $R^5$ and $R^6$ include groups such as methyl, ethyl and propyl groups; however, aryl groups such as the phenyl group may also be used.

Typical examples of the unsaturated hydrocarbons, component (d), having monovalent hydrocarbon groups are as follows:

3-methyl-3-pentene-1-yne

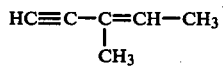

3-methyl-3-hexene-1-yne

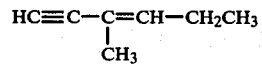

3,5-dimethyl-3-hexene-1-yne

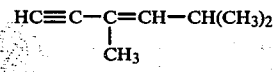

3-ethyl-3-butene-1-yne

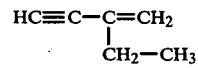

3-phenyl-3-butene-1-yne

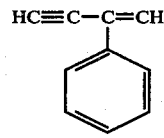

Examples of divalent hydrocarbon groups $R^4$, $R^5$ and $R^6$ include —CH$_2$—, —CH$_2$CH$_2$—, —CH$_2$CH$_2$CH$_2$—, —CH$_2$CH(CH$_3$)CH$_2$—, —CH$_2$C(CH$_3$)$_2$CH$_2$— and —CH$_2$CH(CH$_3$)CH$_2$CH$_2$—.

Typical examples of component (d) which contain divalent hydrocarbon groups which are bonded together by their second valence include

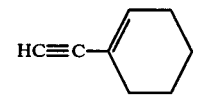

which may be alternatively considered as containing two —CH$_2$CH$_2$— groups or one —CH$_2$— group and one —Ch$_2$CH$_2$CH$_2$— group for $R^4$ and $R^5$. Other examples include

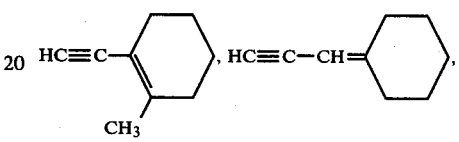

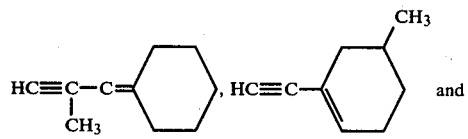

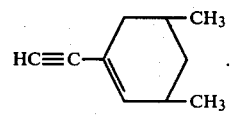

For component (d) to be effective for the purposes of this invention, it is essential to have a structure having an ethynyl group at the end and a double bond which is conjugated with the ethynyl group. The unsaturated hydrocarbons with this specific structure exhibit an excellent effect as storage stabilizers in the compositions of this invention. Since these storage stabilizers have a very high temperature dependence, in particular, their inhibiting ability at a low temperature is excellent compared to conventional storage stabilizers such as alkynyl alcohols, e.g., 3-methyl-1-butyne-3-ol and 3,5-dimethyl-1-hexyne-3-ol, and there is a characteristic that the temperature required for curing of the compositions is much lower than that in the case of conventional compositions. In addition, the storage stability of the compositions of this invention after being left at room temperature is excellent compared to compositions containing conventional storage stabilizers such as 3-phenyl-1-butyne, phenylacetylene and 3-methyl-3-butene-1-yne.

The amount of component (d) to be added can be selected arbitrarily as long as it can be dispersed homogeneously in the polysiloxane components (a) and (b). It is used in a proportion of 2 to 10,000 moles per mole of hydrosilylation catalyst compound as component (c).

Fillers and additives can be compounded in the compositions of this invention in order to reduce thermal shrinkage during the curing process, to reduce the degree of thermal expansion of the elastomer obtained by curing and to improve the thermal stability, weather resistance, chemical resistance, flame retardancy or mechanical strength or to reduce the degree of gas permeation. Examples of these fillers and additives are fumed silica, quartz powder, glass fiber, carbon black, alumina, metal oxides such as iron oxide and titanium oxide and metal carbonates such as calcium carbonate and magnesium carbonate. Moreover, suitable pigments, dyes, blowing agents or antioxidants can be added within a range which does not interfere with the curing process. According to the application and purpose, the compositions of this invention can be diluted with an organic solvent such as xylene or toluene, if desired.

Resinous products, elastic products, gels or foamed products can be obtained from the compositions of this invention by curing. The compositions of this invention are applicable in all applications of conventional curable organopolysiloxane compositions. Examples of such applications are as follows: potting materials, coating materials and molded products for the electrical and electronics industries; potting materials, coating materials and molded products for general industry; rubber for die molding; perforated sections for civil engineering and construction; seam sealants; molded products for medical applications; impression materials for dental applications and materials for liquid injection molding.

Examples of this invention will be described in the following. "Parts" in the examples denotes "parts by weight". The viscosity (cp—centipoise) is the value determined at 25° C. Me and Vi are abbreviations for the methyl group and vinyl group, respectively.

EXAMPLE 1

A dimethylvinylsiloxy-terminated dimethylpolysiloxane (viscosity 500 cp, vinyl content 0.5 wt. %, 100 parts) and an organohydrogenpolysiloxane with the average composition formula

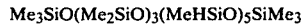
Me$_3$SiO(Me$_2$SiO)$_3$(MeHSiO)$_5$SiMe$_3$ (4 parts) were mixed. 3-Methyl-3-pentene-1-yne (0.02 parts) was added and the mixture was blended to homogeneity. A vinyl-siloxane complex of chloroplatinate was added in an amount such that the platinum content was 5 ppm based on the total amount and the mixture was further blended to homogeneity. The viscosity was 320 cp. When the above-mentioned composition of this invention was allowed to stand at 25° C., the viscosity hardly increased after one day. Curing was completed after about 30 seconds by heating the mixture at 90° C.

COMPARISON EXAMPLE 1

For comparison, the same vinyl group-containing organopolysiloxane and organohydrogenpolysiloxane as in Example 1 were used and 3-methyl-1-butyne-3-ol. (0.02 parts) was added to the same amount of the mixture as in Example 1 and the mixture was blended to homogeneity. Subsequently, the same platinum complex as in Example 1 was added in an amount such that the platinum content was 5 ppm and the mixture was blended to homogeneity. When the mixture was allowed to stand at 25° C., the viscosity hardly increased after one day, but it took about 2 minutes for curing when heated to 90° C. In order to complete curing in 30 seconds, the temperature must have been increased to 120° C.

COMPARISON EXAMPLE 2

The same vinyl group-containing organopolysiloxane and organohydrogenpolysiloxane as in Example 1 were used and 3-phenyl-1-butyne (0.02 parts) was added to the same amount of the mixture as in Example 1, after which the mixture was blended to homogeneity. Subsequently, the same platinum complex as in Example 1 was added in an amount such that the platinum content was 5 ppm and the mixture was further blended to homogeneity. When the mixture was allowed to stand at 25° C., the viscosity exceeded 1000 cp after one day.

COMPARISON EXAMPLE 3

The same vinyl group-containing organopolysiloxane and organohydrogenpolysiloxane as in Example 1 were used. Phenylacetylene (0.02 parts) was added to the same amount of the mixture as in Example 1 and the mixture was blended to homogeneity. The same platinum complex as in Example 1 was added in an amount such that the platinum content was 5 ppm and the mixture was further blended to homogeneity. The viscosity exceeded 1000 cp after one day at 25° C.

COMPARISON EXAMPLE 4

When no storage stabilizer was added to the compositon prepared in Example 1, curing occurred in 7 to 8 minutes at 25° C.

EXAMPLE 2

A dimethylvinylsiloxy-terminated dimethylpolysiloxane (viscosity 2000 cp, vinyl content 0.2 wt %, 100 parts) and a trimethylsiloxy-terminated methylhydrogenpolysiloxane (viscosity 10 cp, 1 part) were mixed. 3,5-Dimethyl-3-hexene-1-yne (0.04 parts) was added and the mixture was blended to homogeneity. Subsequently, a vinylsiloxane complex of chloroplatinate was added in an amount such that the platinum content was 5 ppm based on the total amount and the mixture was further blended to homogeneity. The viscosity was 1900 cp. When the above-mentioned compositon of this invention was allowed to stand at 25° C., the viscosity was barely increased after one day. Curing occurred after about 30 seconds by heating at 90° C.

COMPARISON EXAMPLE 5

A mixture was prepared under the same conditions as in Example 2 except that 3-methyl-1-butyne-3-ol was used as the storage stabilizer instead of the 3,5-dimethyl-3-hexene-1-yne used in Example 2. When the mixture was cured at 90° C., it took 2 minutes and 30 seconds for curing.

COMPARISON EXAMPLE 6

A mixture was prepared under the same conditions as in Example 2 except that 3-methyl-3-butene-1-yne was used instead of 3,5-dimethyl-3-hexene-1-yne used in Example 2. When the mixture was allowed to stand at 25° C. under open conditions, gelation occured after one day.

EXAMPLE 3

A dimethylvinylsiloxy-terminated dimethylsiloxy phenylmethylsiloxy copolymer organopolysiloxane (viscosity 2000 cp, phenylmethylsiloxane units 10 mole %, 100 parts) and an organohydrogenpolysiloxane with the average composition formula

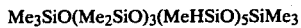
Me$_3$SiO(Me$_2$SiO)$_3$(MeHSiO)$_5$SiMe$_3$ (5 parts) were mixed. 1-ethynyl-1-cyclohexene (0.03 parts) was added and the mixture was blended to homogeneity. A vinylsiloxane complex of chloroplatinate was added in an amount such that the platinum content was 5 ppm based on the total amount and the mixture was blended to homogeneity. The viscosity was 1800 cp. When the above-mentioned composition of this invention was allowed to stand at 25° C. under open conditions, the viscosity hardly changed after one day. Curing was completed after about 30 seconds by heating at 90° C.

COMPARISON EXAMPLE 7

A mixture was prepared under the same conditions as in Example 3 except that 3-methyl-1-butyne-3-ol was used as the storage stabilizer instead of 1-ethynyl-1-cyclohexene used as in Example 3. When the mixture was allowed to stand at 25° C. under open conditions, the viscosity hardly changed after one day. However, the temperature must have been increased to 130° C. in order to complete curing in about 30 seconds.

COMPARISON EXAMPLE 8

A mixture was prepared under the same conditions as in Example 3 except that 3-methyl-3-butene-1-yne was used as the storage stabilizer instead of 1-ethynyl-1-cyclohexene used as in Example 3. When the mixture was allowed to stand under open conditions, gelation occurred after one day.

EXAMPLE 4

A toluene-soluble organopolysiloxane resin composed of 20 mole % $Me_2ViSiO_{\frac{1}{2}}$ units, 20 mole % $Me_3SiO_{\frac{1}{2}}$ units and 60 mole % $SiO_{4/2}$ units (35 parts) was dissolved in toluene (100 parts) and the solution was mixed with a dimethylvinylsiloxy-terminated dimethylpolysiloxane (viscosity 2000 cp, 65 parts). The toluene was removed by evaporation after mixing. The organohydrogenpolysiloxane (6 parts) as in Example 1 was mixed. Subsequently, 3,5-dimethyl-3-hexene-1-yne (0.01 part) was added and the mixture was blended to homogeneity. A vinylsiloxane complex of chloroplatinate was added in an amount such that the platinum content was 5 ppm and the mixture was further blended to homogeneity. The viscosity was 3400 cp. When the resulting composition of this invention was allowed to stand at 25° C., the viscosity hardly increased after one day. Curing occurred in 25 seconds by heating at 90° C.

COMPARISON EXAMPLE 9

A mixture was prepared under the same conditions as in Example 4 except that 3-methyl-1-butyne-3-ol was used instead of 3,5-dimethyl-3-hexene-1-yne used as in Example 4. The same experiment was carried out. When the mixture was allowed to stand at 25° C., the viscosity hardly increased after one day, but the curing time needed was 2 minutes and 30 seconds by heating at 90° C.

That which is claimed is:

1. A composition obtained by a method comprising the mixing of components comprising
   (a) an alkenyl group-containing organopolysiloxane component comprising at least one siloxane unit having the formula $R_a^1 R_b^2 SiO_{(4-a-b)/2}$ wherein $R^1$ denotes a silicon-bonded alkenyl group having from 2 to 4 carbon atoms, inclusive, $R^2$ denotes a silicon-bonded substituted or unsubstituted monovalent hydrocarbon group, a has a value of from 1 to 3, b has a value of from 0 to 2 and a+b has a value of from 1 to 3, all values inclusive, any remaining siloxane units in the alkenyl group-containing organopolysiloxane having the formula $R_x^2 SiO_{(4-x)/2}$ wherein $R^2$ is as denoted above and x has a value of from 0 to 3, inclusive;
   (b) an organohydrogenpolysiloxane component comprising at least one siloxane unit having the formula $H_c R_d^3 SiO_{(4-c-d)/2}$ wherein $R^3$ denotes a silicon-bonded substituted or unsubstituted monovalent hydrocarbon group, c has a value of from 1 to 3, d has a value of from 0 to 2 and c+d has a value of from 1 to 3, all values inclusive, any remaining siloxane units in the organohydrogenpolysiloxane having the formula $R_y^3 SiO_{(4-y)/2}$ wherein $R^3$ is as denoted above and y has a value of from 0 to 3, inclusive;
   (c) a cure catalyzing amount of a hydrosilylation curing catalyst component for the composition; and
   (d) a cure inhibiting amount of an unsaturated hydrocarbon component having the formula $HC{\equiv}C{-}CR^4{=}CR^5 R^6$ wherein each $R^4$, $R^5$ and $R^6$ denotes, independently, a hydrogen atom, a monovalent hydrocarbon group or a divalent hydrocarbon group with the requirements that the total number of carbon atoms in the $R^4$, $R^5$ and $R^6$ groups has a value of from 2 to 6 and when $R^4$ and $R^5$ or $R^5$ and $R^6$ are divalent they are bonded together by their second valence.

2. A composition obtained by the method of claim 1 wherein $R^1$ denotes the vinyl group, component (a) contains an average of at least two silicon-bonded vinyl groups per molecule and component (b) contains an average of at least two silicon-bonded hydrogen atoms per molecule.

3. A composition obtained by the method of claim 2 wherein the number ratio of silicon-bonded hydrogen atoms to silicon-bonded vinyl groups has a value of from 0.2 to 5.0.

4. A composition obtained by the method of claim 3 wherein $R^2$ and $R^3$ denote the methyl group.

5. A composition obtained by the method of claim 4 wherein component (a) is a vinyldimethylsiloxane-endblocked polydimethylsiloxane.

6. A composition obtained by the method of claim 5 wherein component (b) is a trimethylsiloxane-endblocked polymethylhydrogensiloxane having a viscosity of about 10 centipoise at 25° C.

7. A composition obtained by the method of claim 5 wherein component (b) has the formula

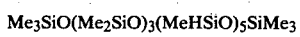

Me₃SiO(Me₂SiO)₃(MeHSiO)₅SiMe₃ wherein Me denotes the methyl group.

8. A composition obtained by the method of claim 5 wherein component (d) is 3-methyl-3-pentene-1-yne.

9. A composition obtained by the method of claim 5 wherein component (d) is 3,5-dimethyl-3-hexene-1-yne.

10. A composition obtained by the method of claim 4 wherein component (a) is a trimethylsiloxane-endblocked methylvinylsiloxane-co-dimethylsiloxane polysiloxane.

11. A composition obtained by the method of claim 10 wherein component (b) is a trimethylsiloxane-endblocked polymethylhydrogensiloxane having a viscosity of about 10 centipoise at 25° C.

12. A composition obtained by the method of claim 10 wherein component (b) has the formula

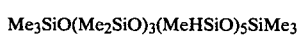

Me₃SiO(Me₂SiO)₃(MeHSiO)₅SiMe₃ wherein Me denotes the methyl group.

13. A composition obtained by the method of claim 3 wherein component (a) contains methyl groups and 3,3,3-trifluoropropyl groups.

14. A composition obtained by the method of claim 13 wherein component (a) is a vinyldimethylsiloxane-endblocked polymethyl-3,3,3-trifluoropropylsiloxane.

15. A composition obtained by the method of claim 3 wherein component (a) contains methyl groups and phenyl groups.

16. A composition obtained by the method of claim 15 wherein component (a) is a phenylmethylvinylsiloxane-endblocked phenylmethylsiloxane-co-dimethylsiloxane polysiloxane.

17. A composition obtained by the method of claim 16 wherein component (d) is 1-ethynyl-1-cyclohexene.

18. A composition obtained by the method of claim 1 wherein component (d) is 3-methyl-3-pentene-1-yne.

19. A composition obtained by the method of claim 1 wherein component (d) is 3,5-dimethyl-3-hexene-1-yne 20. A composition obtained by the method of claim 1 wherein component (d) is 1-ethynyl-1-cyclohexene.

* * * * *